(12) United States Patent
Bergmann

(10) Patent No.: US 11,112,153 B1
(45) Date of Patent: Sep. 7, 2021

(54) METHOD AND SYSTEM FOR HOSE COUPLING

(71) Applicant: James LaMont Bergmann, Akron, OH (US)

(72) Inventor: James LaMont Bergmann, Akron, OH (US)

(*) Notice: Subject to any disclaimer, the term of this patent is extended or adjusted under 35 U.S.C. 154(b) by 139 days.

(21) Appl. No.: 16/253,042

(22) Filed: Jan. 21, 2019

(51) Int. Cl.
*F25B 45/00* (2006.01)
*F16L 33/18* (2006.01)

(52) U.S. Cl.
CPC .............. *F25B 45/00* (2013.01); *F16L 33/18* (2013.01); *F25B 2345/002* (2013.01)

(58) Field of Classification Search
CPC . F16L 33/16; F16L 33/18; F16L 37/05; F16L 37/1225; F25B 45/00
See application file for complete search history.

(56) References Cited

U.S. PATENT DOCUMENTS

| | | | | |
|---|---|---|---|---|
| 5,005,375 A | * | 4/1991 | Manz ................. | B60H 1/00571 137/231 |
| 5,513,882 A | * | 5/1996 | Lewis ................. | F16L 37/1225 285/305 |
| 7,014,225 B1 | * | 3/2006 | Goodsel .................. | F16L 23/04 285/363 |
| 9,127,795 B2 | * | 9/2015 | Chan ....................... | F16L 21/08 |
| 2017/0321835 A1 | * | 11/2017 | Kerg .................... | F16L 37/1225 |

* cited by examiner

*Primary Examiner* — Christopher R Zerphey
(74) *Attorney, Agent, or Firm* — Medley, Behrens & Lewis, LLC

(57) ABSTRACT

An apparatus for connecting an evacuation hose to a system for evacuation of the system. The apparatus includes a first connector, a second connector, and a seal. The first connector includes a first face defining a longitudinally extending indentation and the second connector includes a second face with a protrusion that is positionable within the indentation. The seal is positionable on the protrusion to circumscribe the protrusion and to be sealing engagement with the first connector and the second connector when the protrusion is at a preferred position in the indentation.

19 Claims, 7 Drawing Sheets

METHOD AND SYSTEM FOR HOSE COUPLING

BACKGROUND

Evacuation is the process of degassing and dehydration of a sealed vessel or system. In the refrigeration and air conditioning industries, evacuation can be an important process as air and/or moisture contaminate the refrigeration system causing chemical breakdown of refrigerant and oil in the refrigeration system. In order to perform the evacuation, an evacuation hose is attached to the sealed vessel or system via a coupling attached to the hose. In order to prevent the hose and coupling from separating during evacuation, the coupling is permanently attached to the hose, such as by crimping the coupling to the hose.

The coupling is dimensioned based on dimensions of an attachment point of the refrigeration system. However, the dimensions of the system attachment point are not uniform across the industry and different systems can have different system attachment point dimensions. Therefore, a coupling dimensioned for one refrigeration system may not be suitable for another refrigeration system. Because the coupling is permanently attached to the evacuation hose, the number of refrigeration systems a hose can be attached to is limited.

SUMMARY

The following is a brief summary of subject matter that is described in greater detail herein. This summary is not intended to be limiting as to the scope of the claims.

Disclosed herein are various technologies pertaining to an evacuation hose with a coupling configured for attachment to a refrigeration system. The coupling comprises a first connector, a second connector, and a seal that is positioned between the first connector and the second connector. The first connector can include a first face defining a longitudinally extending indentation and the second connector can include a second face with a protrusion that is positionable within the indentation. The seal is positionable on the protrusion to be in sealing engagement with the first connector and the second connector when the first connector is removably attached to the second connector.

The second connector is attached to the evacuation hose and the first connector includes an attachment portion that is dimensioned for attachment to a first refrigeration system. The first connector and the seal can be removably attached to the second connector and the attached evacuation hose to evacuate the first refrigeration system. A user can use the same second connector and attached evacuation hose to evacuate a second refrigeration system, which has different dimensions than the first refrigeration system, by removing the first connector and replacing it with a third connector with an attachment portion that is dimensioned for attachment to the second refrigeration system. During this swap, the user may additionally remove the seal and replace it with a second seal. Thus, by swapping part of the coupling (e.g., the first connector) the same evacuation hose can be used for evacuation of different dimensioned refrigeration systems.

The coupling is further configured to restrict fluid flow between the evacuation hose and a refrigeration system. To that end, the first connector can include a first fluid passageway and the second connector can include a second fluid passageway that are aligned when the first connector is removably attached to the second connector. The protrusion on the second connector and the indentation of the first connector can be configured to cooperate to assist with aligning the first fluid passageway and the second fluid passageway during attachment. The third connector can include an indentation like the first connector such that a third fluid passageway in the third connector can be aligned with the second fluid passageway when the third connector is attached to the second connector.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
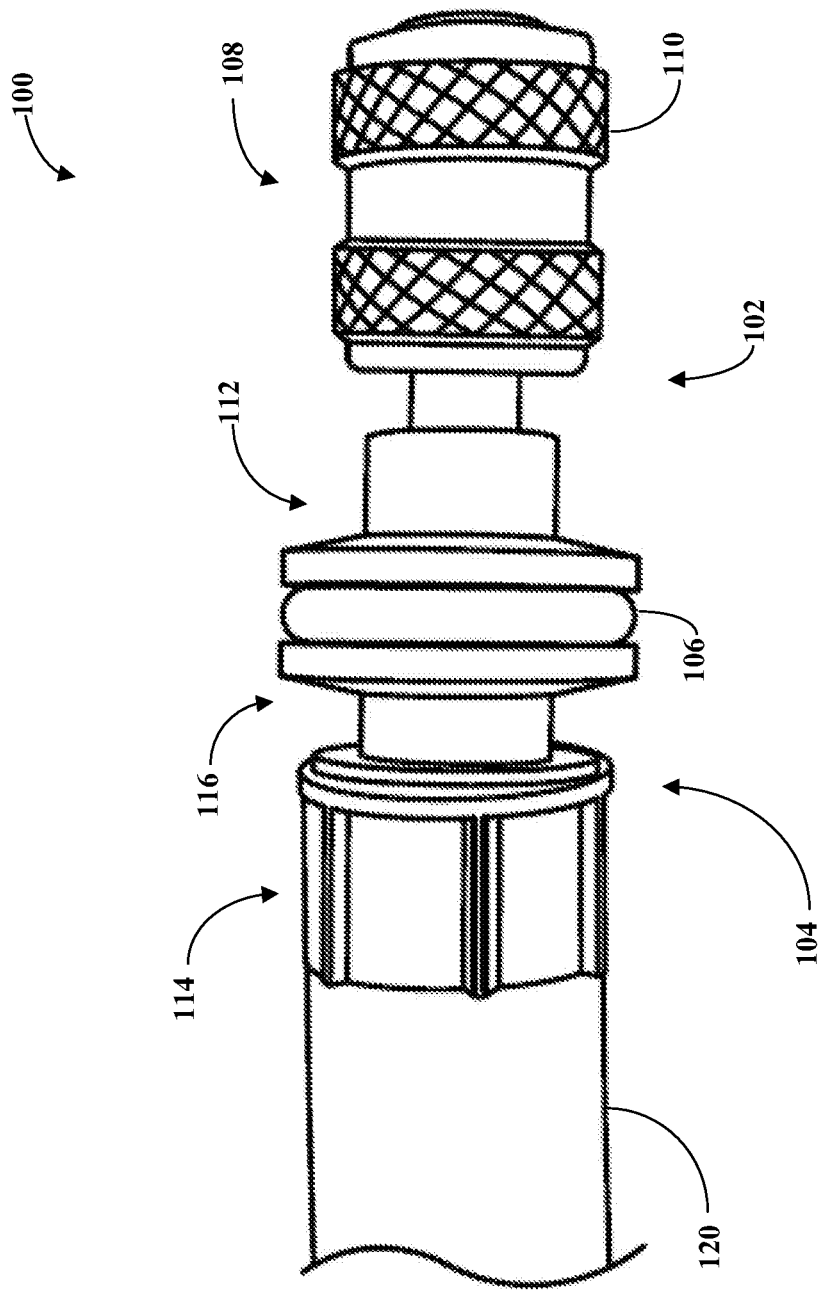
FIG. 1 illustrates an exemplary connection apparatus.

Various technologies pertaining to connecting an evacuation hose to a refrigeration system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for connecting an evacuation hose to a system for evacuation of the system. The disclosed apparatus can include at least two connectors that can be removably connected to one another. A first connector of the disclosed apparatus includes a system attachment portion that can be connected to a system attachment point of an HVAC and/or refrigeration system. A second connector of the disclosed apparatus can be permanently attached to an end of the evacuation hose. The disclosed apparatus allows a user to use the same evacuation hose for different system attachment points by changing the first connector.

Turning to FIG. 1, illustrated is one embodiment of an apparatus 100 for connecting an evacuation hose 120 to a system (e.g., a refrigeration system) to create a vacuum state in that system. The system can be part of an HVAC system, an appliance (e.g. refrigerator), or the like. Evacuation comprises the removal of non-condensable material (e.g. air) and contaminants from the system. The illustrated apparatus 100 includes a first connector 102, a second connector 104, and a seal 106 sandwiched therebetween. The first connector 102 and the second connector 104 can be in fluid communication to allow fluid flow therethrough from the system to the evacuation hose 120. The fluid can include gas, liquid, or the like. Broadly, the apparatus 100 can be configured to connect to the system to allow fluid flow along a fluid path from the system to the evacuation hose 120, as will be described in detail below.

As illustrated in FIG. 1, the first connector 102 can comprise a longitudinally extending connector surrounding a first fluid passageway. The first fluid passageway can include an inlet and an opposing outlet and can be configured to allow flow therethrough. The first connector 102 is configured to connect to the system such that the inlet of the first fluid passageway is in fluid communication with the system.

Similar to the first connector 102, the second connector 104 can comprise a longitudinally extending connector surrounding a second fluid passageway. The second fluid passageway can include an inlet and an opposing outlet and can be configured to allow flow therethrough. The second connector 104 is configured to connect to the evacuation hose 120 such that the outlet of the second fluid passageway is in fluid communication with the evacuation hose 120.

When the first connector 102 and the second connector 104 are in sealing engagement with the seal 106, the outlet of the first fluid passageway is in (sealed) fluid communication with the inlet of the second fluid passageway to restrict fluid flow therethrough. This fluid communication results in fluid connection of the system to the evacuation hose 120. In order to align the first fluid passageway and the second fluid passageway, one connector can include a male section and the other connector can include a corresponding female section configured to receive the male section, as will described in detail below.

The seal 106 is configured to create a sealing engagement with the first connector 102 and the second connector 104 when the apparatus 100 is assembled. The seal 106 can comprise an O-ring and/or gasket and may be made of any suitable polymeric material, such as thermoplastic or elastomer. For instance, the seal 106 can be made of flexible and/or elastomeric material for ease of use and good sealing.

As shown in FIG. 1, the connector of the first connector 102 can be generally cylindrical with sections of varying outer diameters. While the first connector 102 is described as having the shape illustrated in FIG. 1, other shapes are also contemplated. For instance, cross-section of the exterior of the first connector 102 can be oval, square, rectangular, triangular, polygonal, or the like.

A first portion including a first end face of the first connector 102 forms a system attachment portion 108 configured for connection to the system. The system attachment portion 108 can take any suitable shape or size for connection to the system. For instance, the system attachment portion 108 can include interior or exterior threading, a pneumatic mechanism, a push-push arrangement, and/or the like. The system attachment portion 108 can further include contouring on its outer surface to assist the user in gripping the system attachment portion 108 while connecting to the system. For instance, in the illustrated embodiment, the system attachment portion 108 includes knurled surfaces 110 on the outer surface. In another instance, the system attachment portion 108 includes indentation(s) that the user can place their finger(s) in during connection.

The first connector 102 further includes a first connector sealing portion 112 configured to interact with the seal 106 to form a sealing engagement therebetween. In the illustrated embodiment, the first connector sealing portion 112 comprises a flange opposite the system attachment portion 108. The first connector sealing portion 112 can be formed at any suitable position on the first connector 102.

Similar to the illustrated first connector 102, the connector of the illustrated second connector 104 can be generally cylindrical with sections of varying outer diameters. While the second connector 104 is described as having the shape illustrated in FIG. 1, other shapes are also contemplated. For instance, cross-section of the exterior of the second connector 104 can be oval, square, rectangular, triangular, polygonal, or the like.

A first portion including a first end face of the second connector 104 forms a hose attachment portion 114 configured for attachment to the end of the evacuation hose 120. The hose attachment portion 114 can take any suitable shape or size for attachment to the end of the evacuation hose 120. For instance, the hose attachment portion 114 can be hollow and an interior diameter of the hose attachment portion 114 is sized to receive and circumscribe the evacuation hose 120. The hose attachment portion 114 can be attached permanently to the end of the evacuation hose 120 or can be removably attached. In the illustrated embodiment, the hose attachment portion 114 is permanently attached to the end of the evacuation hose 120 via crimping.

In another embodiment, the hose attachment portion 114 can be configured to sandwich an end of the evacuation hose 120 between a first portion and a second portion. More specifically, the first portion can have an interior diameter sized to receive and circumscribe the evacuation hose 120 and the second portion can have an exterior diameter sized for insertion into an interior of the evacuation hose 120 as the first portion receives the evacuation hose 120. An exterior surface of the second portion and/or an interior surface of the first portion can include contouring configured to engage a surface of the evacuation hose 120 to retain the evacuation hose 120 in a desired position within the hose attachment portion 114 prior to permanent attachment. For instance, the second portion can include a hose barb with one or more barb-like rings that engage the interior surface of the evacuation hose 120. The second portion can further be hollow to allow fluid flow therethrough. The first portion and the second portion can extend along the evacuation hose 120 for the same distance or the distance can vary.

The second connector 104 further includes a second connector sealing portion 116 configured to interact with the seal 106 to form a sealing engagement therebetween. In the illustrated embodiment, the second connector sealing portion 116 comprises a flange opposite the hose attachment portion 114. The second connector sealing portion 116 can be formed at any suitable position on the second connector 104.

Figure 2:
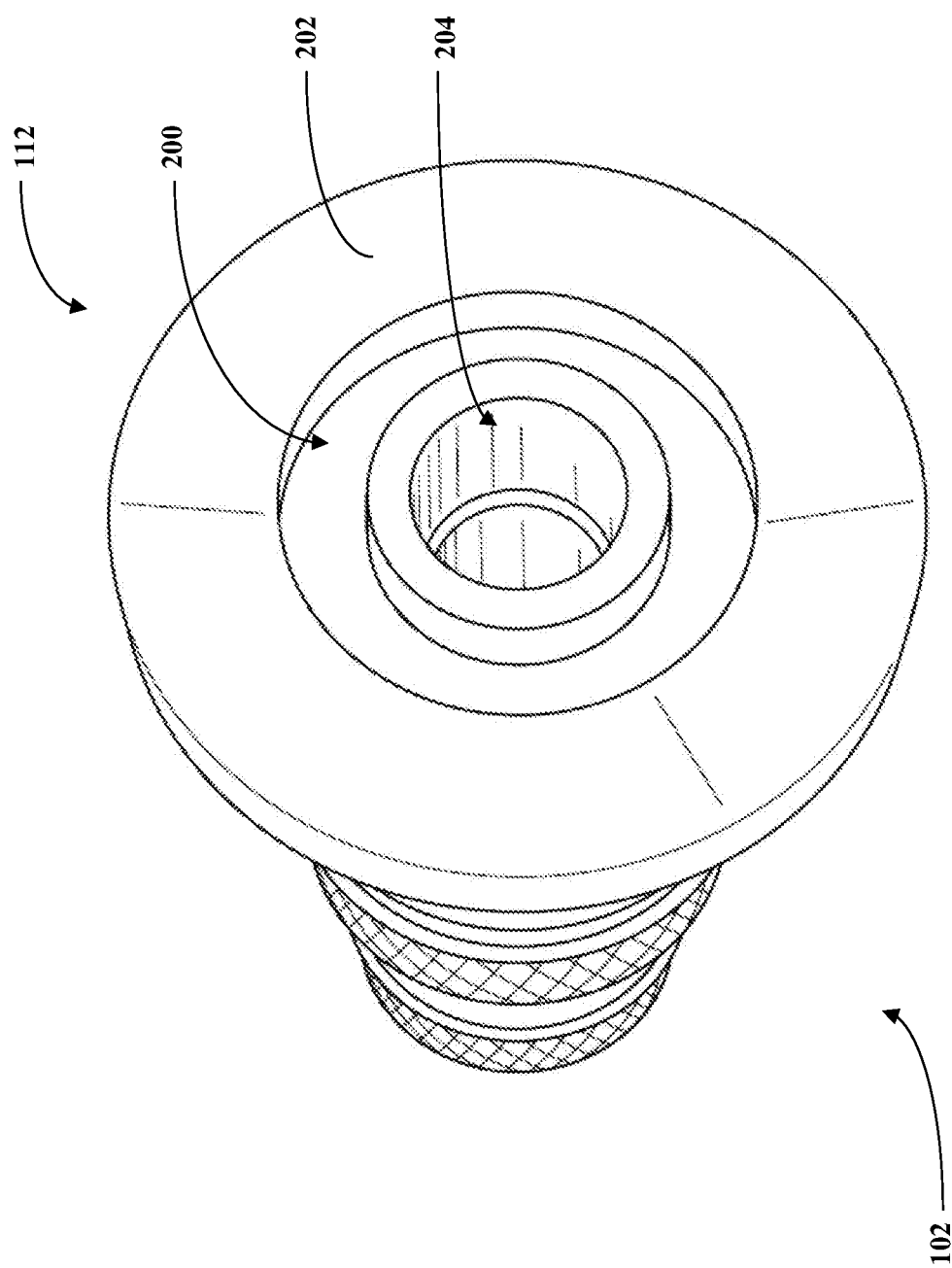
FIG. 2 illustrates an exemplary first connector of a connection apparatus.
Figure 3:
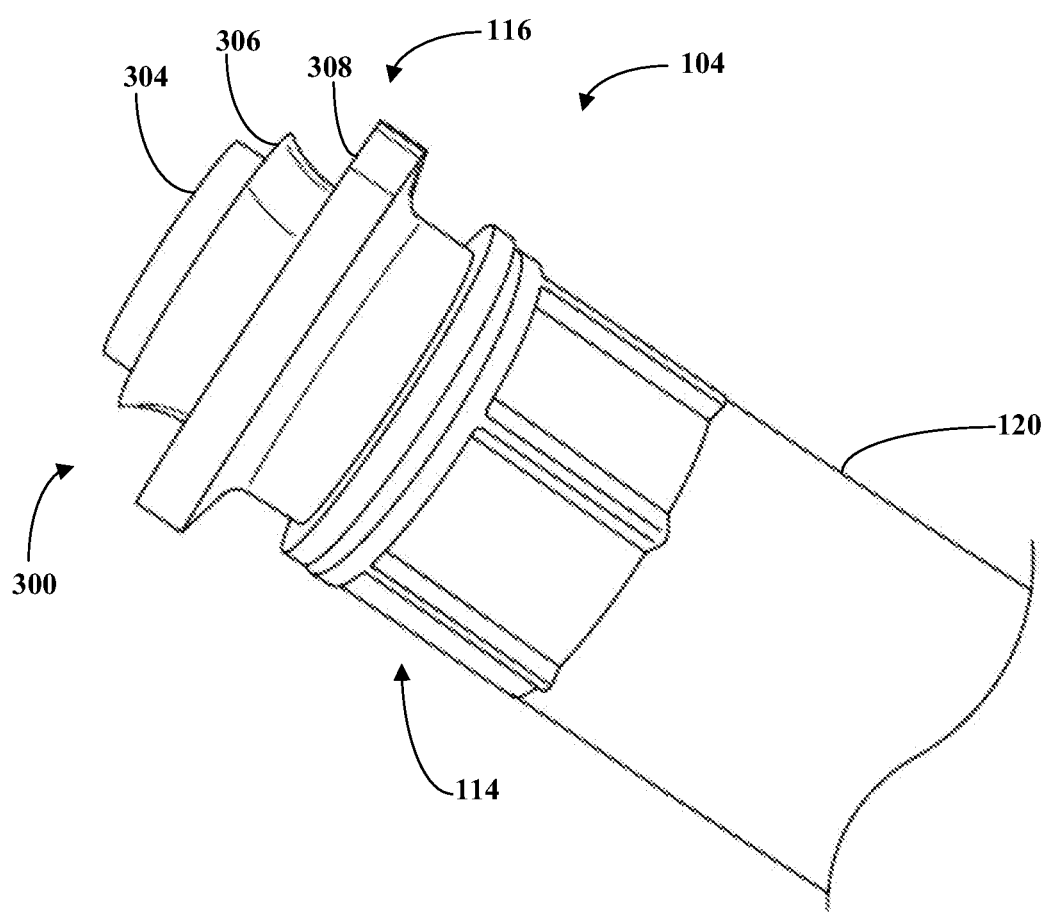
FIG. 3 illustrates an exemplary second connector of a connection apparatus.

Turning now to FIGS. 2 and 3, illustrated are embodiments of the first portion 102 having a female section 200 and the second portion 104 having a male projecting portion 300 respectively. The male projecting portion 300 and the corresponding female section 200 can be configured to assist in aligning the first fluid passageway of the first connector 102 and the second fluid passageway of the second connector 104. In the following discussion and illustrations, the second connector 104 includes a male projecting portion 300 and the first connector 102 includes a corresponding female section 200, however the sections may be switched (i.e., the first connector 102 includes a male projecting portion 300 and the second connector 104 includes a corresponding female section 200).

As illustrated in FIG. 2, the female section 200 is located on the first connector sealing portion 112. The first connector sealing portion 112 may further include a first connector sealing face 202 and may define an outlet 204 of the first fluid passageway. The first connector sealing face 202 can be configured to interact with the seal 106 to form sealing engagement therebetween. The female section 200 is configured to receive the corresponding male projecting portion 300 (FIG. 3) of the second portion 104. In the illustrated embodiment, the first connector sealing face 202, the female section 200, and the outlet 204 of the first fluid passageway each have a circular cross-section and are arranged to form concentric circles. However, cross-sections and/or arrangement of the first connector sealing face 202, the female section 200, and the outlet 204 of the first fluid passageway may vary with respect to each other.

In the illustrated embodiment, the first fluid passageway has a circular cross-section. The first fluid passageway can take any shape consistent with allowing flow therethrough. For example, the cross-section of the first fluid passageway can be oval, square, rectangular, triangular, polygonal, varying, or the like.

The female section 200 can be configured to receive and retain at least a portion of the male projecting portion 300 when the first connector 102, the second connector 104, and the seal 106 are in sealing engagement. As illustrated in FIG. 2, the female section 200 comprises a longitudinally extending indentation configured to receive at least a portion of the male portion of the second connector 104. The indentation can be arranged on the first connector sealing portion 112 to circumscribe the outlet 204 of the of the first fluid passageway as illustrated. For instance, the indentation can have an annular cross-section so as to circumscribe the outlet 204 of the first fluid passageway. The cross-section of the indentation can take any suitable shape and may be defined based on the cross-section of the male projecting portion 300.

In the illustrated embodiment, the female section 200 comprises a single, contiguous indentation circumscribing the outlet 204 of the first fluid passageway. In another embodiment, the female section 200 comprises a plurality of separate indentations arrayed around the outlet 204 of the first fluid passageway. The female section 200 can comprise any number and/or arrangement of indentations suitable for receiving and retaining the male projecting portion 300. For instance, the number and arrangement of indentations can be based on the shape of the male projecting portion 300.

The first connector sealing face 202 can be configured to engage a portion of the seal 106 to form the sealing engagement. In the illustrated embodiment, the first connector sealing face 202 is arranged on the first connector sealing portion 112 to circumscribe the female section 200. The first connector sealing face 202 can be planar, as illustrated, or can include indentations and/or protrusions as so desired, so long as the first portion 102 can be in sealing engagement with the second portion 104.

Turning now to FIG. 3, illustrated is an embodiment of the male projecting portion 300. The male projecting portion 300 can be located at the second connector sealing portion 116. The second connector sealing portion 116 can further include a second connector sealing face 308. The male projecting portion 300 can extend longitudinally from the second connector sealing portion 116 coaxially with the hose attachment portion 114 of the second connector 104. The male projecting portion 300 can further include at a distal end the inlet of the second fluid passageway. In that embodiment, an inner surface of the male projecting portion 300 can form a part of the second fluid passageway.

As illustrated, the male projecting portion 300 can be generally cylindrical with sections of varying diameters. While the male projecting portion 300 is described as having the shape illustrated in FIG. 3, other shapes are also contemplated. For instance, cross-section of the exterior of the male projecting portion 300 can be oval, square, rectangular, triangular, polygonal, or the like. Additionally, although the male projecting portion 300 is illustrated as being a singular, contiguous projection, the male projecting portion 300 can comprise any number of arrayed projections.

An outer surface of the male projecting portion 300 can include a first segment 304 with a first diameter and an adjacent second segment 306 with a second diameter. The first diameter and the second diameter can be different or can be equal.

The first segment 304 of the male projecting portion 300 can be configured to fit within the female section 200 when the first connector 102 and the second connector 104 are in sealing engagement with the seal 106. This interaction of the first segment 304 and the female section 200 can align a center of the outlet 204 of the first fluid passageway with a center of the inlet of the second fluid passageway. Additionally, because of this interaction, there can be a correlation between the shape and/or dimensions of the first segment 304 and the shape and/or dimensions of the female section 200.

The second segment 306 of the male projecting portion 300 can be configured to retain the seal 106 in a sealing position location on the male projecting portion 300 while the first segment 304 is inserted into the female section 200 of the first connector 102. The sealing position location is the position which will result in the seal 106 being in sealing engagement with both the first connector 102 and the second connector 104 when the first segment 304 of the male projecting portion 300 is inserted into the female section 200 and the first fluid passageway and the second fluid passageway are in fluid communication creating the third fluid passageway. Accordingly, the sealing position location on the male projecting portion 300 can change based on the geometry of at least one of the first connector 102, the second connector 104, or the seal 106. In the embodiment illustrated in FIG. 3, the sealing position location is directly adjacent the second sealing surface.

The second segment 306 can take any suitable shape and/or size to retain the seal 106. An outer surface of the second segment 306, or at least a portion thereof, can be further contoured to form a seat for the seal 106. For instance, in the embodiment illustrated in FIG. 3, the outer surface of the second segment 306 includes a portion with a concave contour configured to retain the seal 106 in the sealing position. In this embodiment, the dimensions of the concave contour can be based on the dimensions of a torus-shaped seal 106.

The second connector sealing face 308 can be configured to engage a portion of the seal 106 to form the sealing engagement. In the illustrated embodiment, the second connector sealing face 308 is arranged on the second connector sealing portion 116 to circumscribe the male projecting portion 300. The second connector sealing face 308 can be planar, as illustrated, or can include indentations and/or protrusions as so desired.

Figure 4:
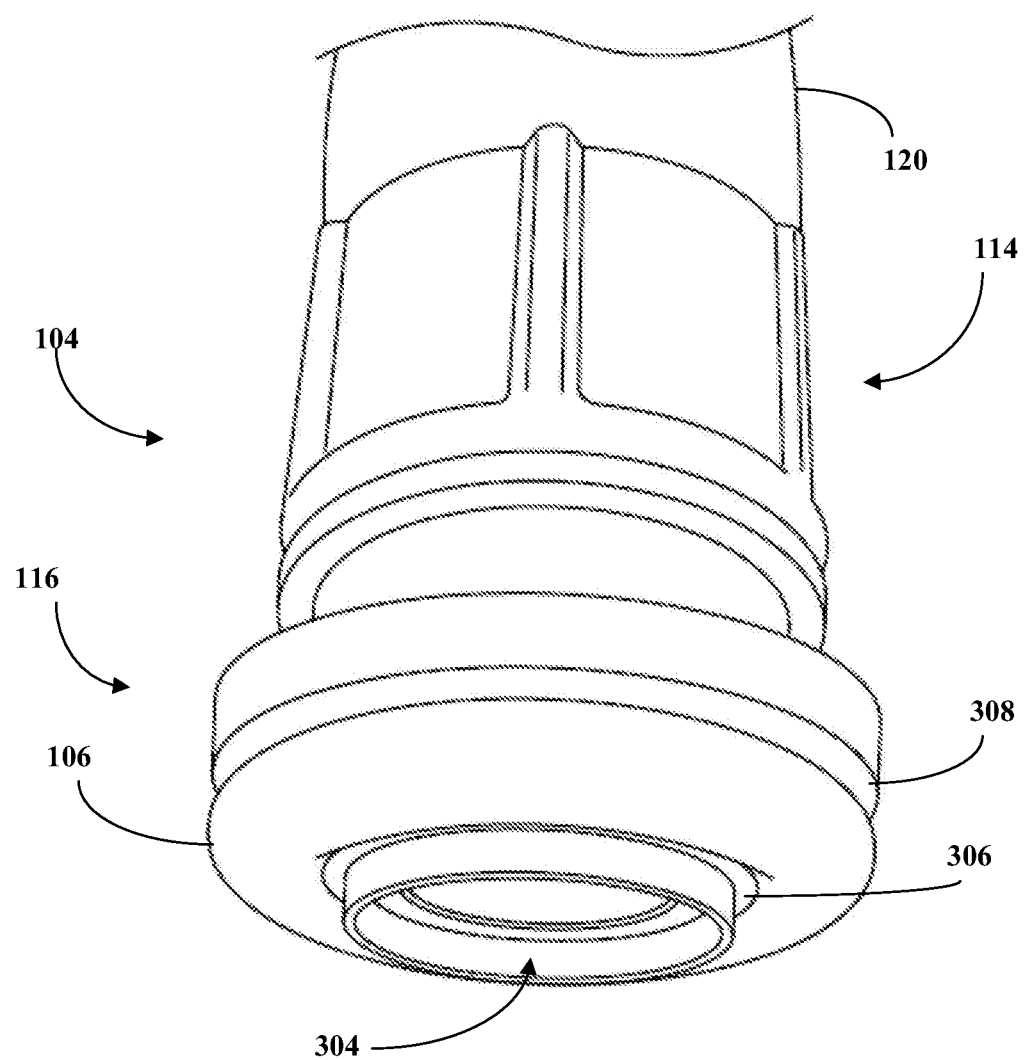
FIG. 4 illustrates another exemplary second connector.

Turning now to FIG. 4, illustrated is an embodiment of the second connector 104 with a torus-shaped seal 106 retained in the sealing position location on the male projecting portion 300. In the illustrated embodiment, when the torus-shaped seal 106 is retained at the sealing position location a portion of the seal 106 is in contact with the second sealing surface. To further retain the seal 106 on the male projecting portion 300, the second segment 306 can include a concave contour that the seal 106 sits in. The concave contour can be dimensioned such that the innermost point of the interior portion of the torus rests in the lowest point of the concave contour when the seal 106 is retained in the sealing position location. In the illustrated embodiment, the seal 106 is made of elastic material allowing a user to stretch the seal 106 over the contour while attaching the seal 106 to the second segment 306.

Figure 5:
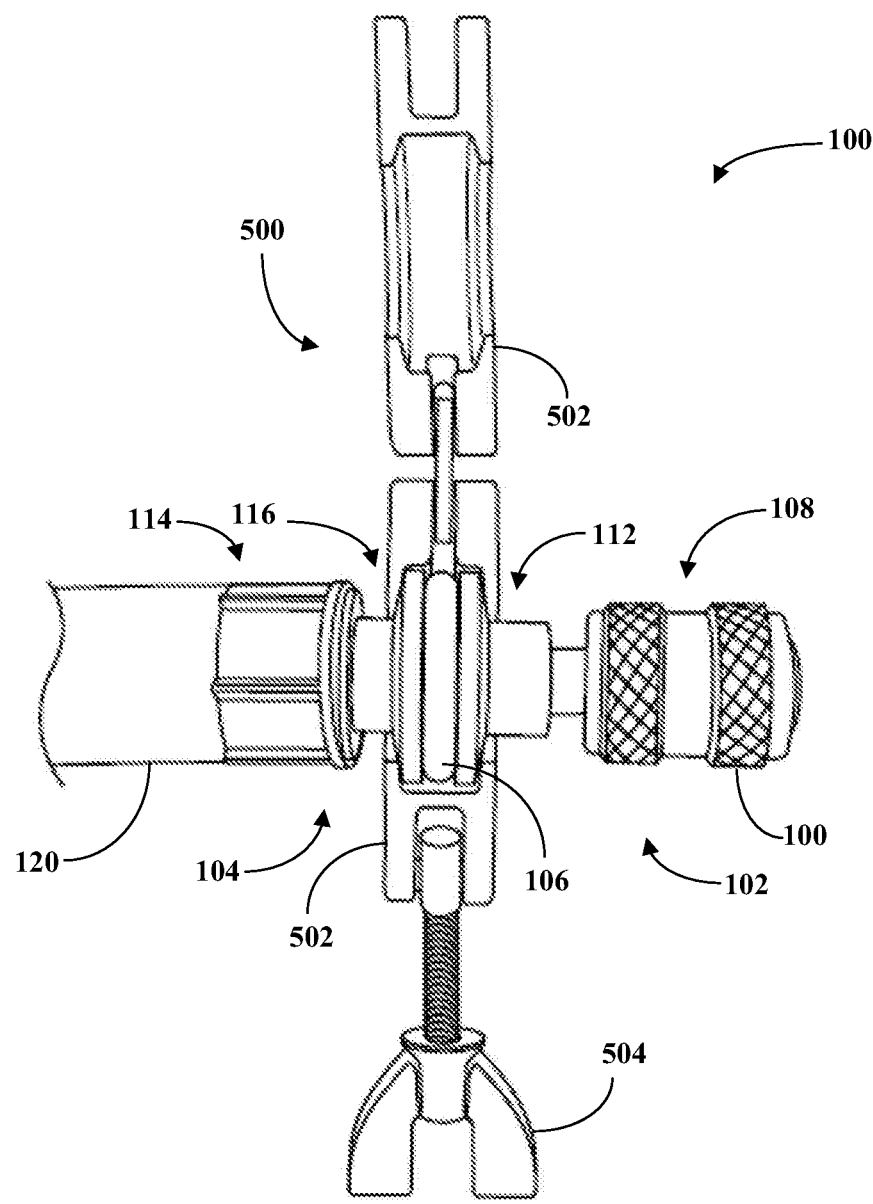
FIG. 5 illustrates another exemplary connection apparatus.

The apparatus 100 can be further configured to self-seal when a vacuum is formed during the evacuation process. The pressure from the vacuum retains the first connector 102 and the second connector 104 in sealing engagement with the seal 106. As illustrated in FIGS. 5, 6A, and 6B, prior to forming the vacuum, the apparatus 100 can further employ a clamp to maintain the first connector 102 and the second connector 104 in sealing engagement with the seal 106. Once the vacuum is formed, the clamp can be removed or can be left on. Any clamp that would maintain the first connector 102 and the second connector 104 in sealing engagement with the seal 106 can be used.

For example, illustrated in FIG. 5, the clamp can comprise a hinge clamp 500 that is currently open, i.e. the arms 502 of the hinge clamp 500 are not joined around the apparatus 100. In the illustrated embodiment, the hinge clamp 500 further includes interior walls that deform the seal 106 by pressing the first connector 102 and the second connector 104 towards each other to maintain the sealing engagement. The interior walls of the hinge clamp 500 can engage any portion of the first connector 102 and/or second connector 104 that will allow the hinge clamp 500 to maintain the sealing engagement. For instance, as illustrated, the interior walls of the hinge clamp 500 can be configured to engage and press on the first connector sealing portion 112 and the second connector sealing portion 116.

The hinge clamp 500 can further include tightening means 504 for joining the two arms 502 of the hinge clamp 500 around the apparatus 100. For instance, as illustrated, the tightening means 504 comprise a threaded screw and a wing nut that a user can tighten along the threaded screw to join the two arms 502. Other tightening means 504 can be employed, such as pneumatic, electric, and/or other mechanical systems.

Figure 6:
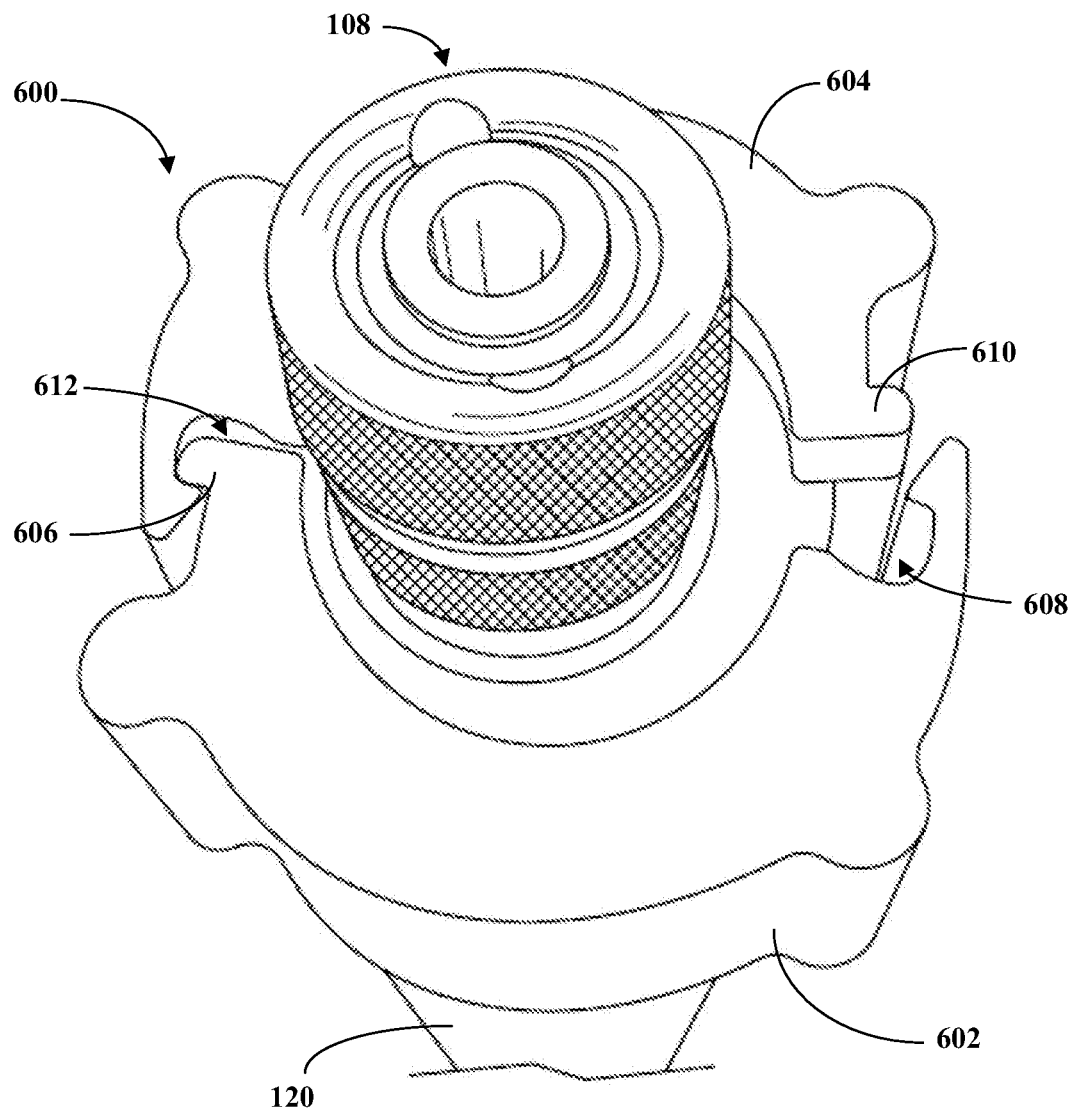
FIG. 6 illustrates yet another exemplary connection apparatus.

In another embodiment, illustrated in FIG. 6, the clamp can comprise a snap clamp 600 that includes two separate pieces 602 and 604 that can be interlocked (snapped together) to maintain the first connector 102 and the second connector 104 in sealing engagement with the seal 106. Any suitable structure may be used for interlocking the two pieces together. For instance, in the illustrated embodiment, a protrusion on an exterior surface of a piece snaps into and is retained within a corresponding notch on an interior surface of the other piece when the clamp is fastened around the first connector 102, second connector 104, and seal 106. Each piece 602 and 604 can include both a protrusion 606 and 610 on an exterior surface and a notch 608 and 612 on an interior surface, as illustrated. Each piece 602 and 604 can further include a rib that is configured to retain the protrusion within the notch. Similar to the hinge clamp 500, interior walls of the interlocking clamp 600 deform the 106 by pressing the first connector 102 and the second connect 104 towards each other to maintain the sealing engagement. The snap clamp 600 can be made of any suitable material, such as metal, a plastic material, and/or the like. Additionally, the two pieces 602 and 604 may be made of the same material or they may vary.

In the illustrated embodiment, the snap clamp 600 is open, i.e. the two pieces 602 and 604 are not fully interlocked. In the illustrated embodiment, the protrusion 606 of the first piece 602 is retained within the notch 612 of the second piece 604 and the protrusion 610 of the second piece 604 is outside the notch 608 of the first piece 602. A user can then snap the snap clamp 600 closed by pressing the protrusion 610 of the second piece 604 into the notch 608 of the first piece 602.

Figure 7A:
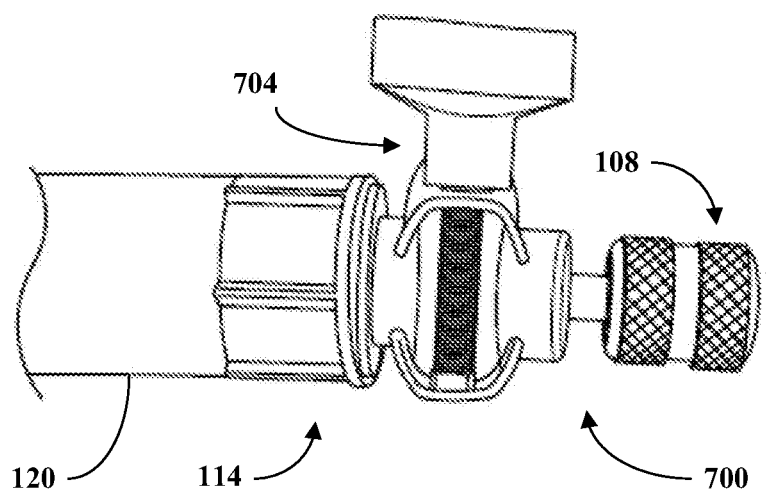
FIG. 7A-7B illustrate exemplary connection apparatuses with differing first connectors.
Figure 7B:
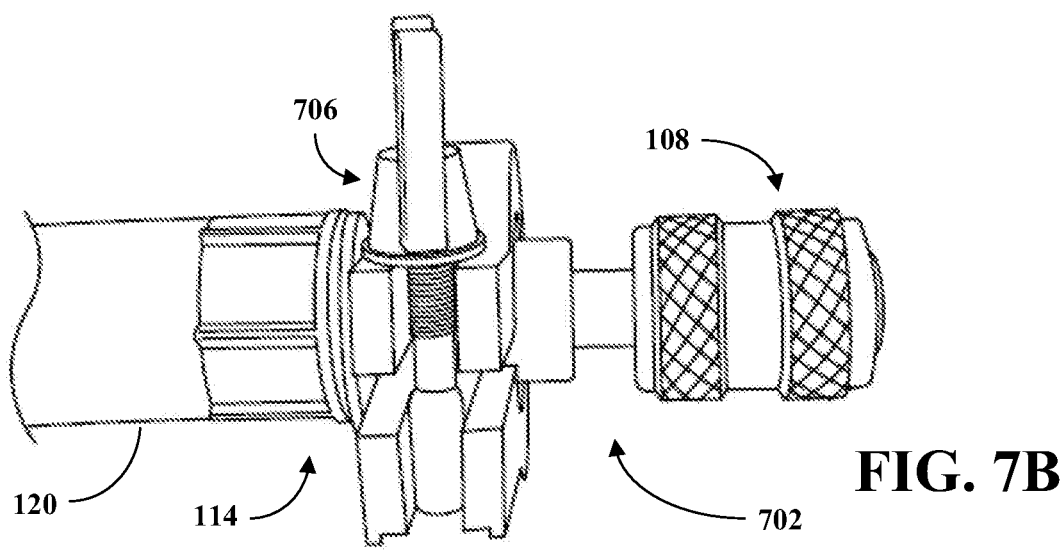

Turning now to FIGS. 7A and 7B, illustrated are two example embodiments of the apparatus 100 employing the same second connector 104 with two different first connectors 700 and 702. As discussed above, the apparatus 100 allows a user to replace the first connector 102, and by extension the system attachment portion 108, without having to also replace the second connector 104, and by extension the evacuation hose 120. The user can also change the seal 106 when they change first connector 700 and 702, or the same seal 106 can be employed on the male projecting portion 300 of the second connector 104.

As illustrated, the first connector 700 in FIG. 7A includes a system attachment portion 108 with a first set of dimensions. Whereas, the first connector 702 in FIG. 7B includes a system attachment portion 108 with a second set of dimensions that are different from the first set. The different dimensions can be employed for different system attachment point dimensions.

The first connector 700 illustrated in FIG. 7A and the first connector 702 illustrated in FIG. 7B can include portions that have similar dimensions. For instance, because the same second connector 104 is used for both, the dimensions of the male portion of the apparatus 100 are the same for both, and therefore the dimensions of the female portion of each illustrated first connector 700 and 702 should be the same.

Additionally, the same clamp can be employed for a plurality of different first connectors (e.g., first connector 700 and first connector 702) or the clamp can vary. For instance, FIGS. 7A and 7B illustrate embodiments where different clamps 704 and 706, respectively, are employed. Different clamp can be employed where the connector of one first connector 702 connected to a second connector 104 is larger than the connector of another first connector 700 connected to the same second connector 104, as can be seen in FIGS. 7A and 7B.

As regards the evacuation hose 120, the apparatus 100 is configured to attach to any suitable hose 120 that can be employed for evacuation of the system. For instance, the hose 120 can comprise spring-reinforced tubing. The tubing can be made of any suitable material, such as vinyl or low-adsorption material. The interior diameter of the hose 120 can be any suitable dimension, for instance ¼", ¾", or 2".

Additionally, an interior diameter of the evacuation hose 120 and the diameter of the first fluid passageway and/or second fluid passageway can be similar or can vary. For example, the evacuation hose 120 can have a ¾" interior diameter while the first fluid passageway and the second fluid passageway have ½" diameters. Additionally, the diameter of the first fluid passageway and the diameter of the second fluid passageway need not be equal and can vary.

The above described first connector and second connector can be made of any suitable material. Additionally, the entire connector can be made of a singular material type or different portions can be made of different material. For instance, in one embodiment the entire second connector is made of stainless steel, which can provide rigidity. In another embodiment, the male portion of the second connector is made of stainless steel while the remaining portions of the second connector are made of different material (e.g., aluminum, brass, non-stainless steel, etc.).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus comprising:
   an evacuation hose that is configured to evacuate content of a refrigeration system;
   a system attachment portion that is configured for attachment to the refrigeration system;
   a first connector that is configured for attachment to the refrigeration system, the first connector including a first face, wherein the first face defines an outlet of a first fluid passageway, wherein the first face further includes a longitudinally extending indentation that circumscribes the outlet of the first fluid passageway;
   a second connector including a second face, wherein the second face defines an outlet of a second fluid passageway, wherein the second face includes a protrusion extending therefrom, wherein the protrusion comprises a first portion and a second portion, wherein the outlet of the second fluid passageway is recessed with respect to an end of the protrusion, wherein the first portion of the protrusion is positionable within the indentation of the first connector, wherein positioning the first portion of the protrusion within the indentation aligns the outlet of the first fluid passageway and the outlet of the second fluid passageway, and wherein one of the first connector or the second connector is coupled to the evacuation hose and wherein the other of the first connector or the second connector includes the system attachment portion; and
   a seal positionable on the second portion of the protrusion of the second connector,
   wherein the seal is positioned on the second portion of the protrusion of the second connector to circumscribe the second portion of the protrusion and to be in sealing engagement with the first connector and the second connector when the first portion of the protrusion is at a preferred position in the indentation.

2. The apparatus of claim 1, wherein the second connector is coupled to the evacuation hose, and further wherein the second connector further includes a portion configured to be attached to an exterior diameter of the evacuation hose by crimping.

3. The apparatus of claim 1, wherein the first connector includes the system attachment portion configured for attachment to the refrigeration system.

4. The apparatus of claim 1, wherein the second face of the second connector comprises a planar surface that engages a first side of the seal in sealing engagement when the first portion of the second connector is at the preferred position in the indentation.

5. The apparatus of claim 4, wherein the first face of the first connector comprises a planar surface that engages a second side of the seal in sealing engagement when the second connector is at the preferred position in the indentation, wherein the second side of the seal is opposite the first side of the seal.

6. The apparatus of claim 5, wherein the protrusion of the second connector further includes a radially extending projection configured to engage a third side of the seal to removably retain the seal in a position on the protrusion.

7. The apparatus of claim 1, wherein the protrusion of the second connector forms a centering ring at a distal end of the protrusion.

8. The apparatus of claim 7, wherein the indentation of the first connector is configured to receive the centering ring when the second connector is at the preferred position in the indentation.

9. The apparatus of claim 1, wherein the first fluid passageway and the second fluid passageway align to restrict fluid flow between the hose and the refrigeration system.

10. The apparatus of claim 1, further comprising a clamp configured to clamp the seal in sealing engagement to the first connector and to the second connector.

11. The apparatus of claim 1, wherein the first connector and the second connector are made of stainless steel.

12. The apparatus of claim 1, wherein the seal comprises an O-ring.

13. A method of connecting a coupling comprising:
    positioning a seal on a protrusion of a second connector, wherein the seal is positioned to circumscribe the protrusion of the second connector, wherein the second connector comprises a second face defining an outlet of a second fluid passageway, wherein the protrusion extends from the second face such that the outlet of the second fluid passageway is recessed with respect to an end of the protrusion;
    aligning the protrusion of the second connector with a longitudinally extending indentation of a first connector, wherein the first connector includes a first face defining an outlet of a first fluid passageway, wherein the indentation is formed on the first face and circumscribes the outlet of the first fluid passageway;
    positioning the protrusion of the second connector in the longitudinally extending indentation of the first connector such that the seal is in sealing engagement with the first connector and the second connector; and coupling at least one of the first connector or the second connector to an evacuation hose, wherein the evacuation hose is configured for use in evacuating fluid from a refrigeration system, wherein the other of the first connector or the second connector includes a system attachment portion that is configured for attachment to the refrigeration system.

14. The method of claim 13, further comprising:
attaching a clamp around the seal, at least a portion of the first connector, and at least a portion of the second connector, wherein the clamp is configured to clamp the seal in sealing engagement with the first connector and with the second connector.

15. The method of claim 13, wherein the second face of the second connector comprises a planar surface configured to engage a first side of the seal in sealing engagement when the protrusion of the second connector is positioned in the indentation of the first connector.

16. The method of claim 15, wherein the first face is configured to engage a second side of the seal in sealing engagement when the protrusion of the second connector is positioned in the indentation of the first connector, wherein the second side of the seal is opposite the first side of the seal.

17. The method of claim 13, wherein the projection of the second connector forms a centering ring at a distal end of the projection, wherein positioning the projection of the second connector in the indentation of the first connector comprises positioning the centering ring in the indentation.

18. The method of claim 13, wherein aligning the projection of the second connector with the indentation of the first connector aligns the first fluid passageway in the first connector and the second fluid passageway in the second connector.

19. The method of claim 18, wherein positioning the protrusion of the second connector in the longitudinally extending indentation of the first connector restricts flow of fluid to the first fluid passageway and the second fluid passageway.

\* \* \* \* \*